US006705673B1

(12) United States Patent
Sorensen et al.

(10) Patent No.: US 6,705,673 B1
(45) Date of Patent: Mar. 16, 2004

(54) LATCHED WIND DEFLECTOR SYSTEM

(75) Inventors: Craig L. Sorensen, Marysville, OH (US); Michael T. Binfet, Bellefontaine, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/256,967

(22) Filed: Sep. 27, 2002

(51) Int. Cl.$^7$ .................................................. B60J 7/22
(52) U.S. Cl. ........................................................ 296/217
(58) Field of Search .......................................... 296/217

(56) References Cited

U.S. PATENT DOCUMENTS

| | | | | |
|---|---|---|---|---|
| 4,342,481 A | * | 8/1982 | Kanou et al. | 296/217 |
| 4,681,364 A | | 7/1987 | Bienert et al. | 296/217 |
| 4,781,410 A | | 11/1988 | Ganter et al. | 296/217 |
| 4,844,538 A | | 7/1989 | Ricks | 296/217 |
| 4,971,387 A | | 11/1990 | Bohm et al. | 296/217 |
| 5,018,783 A | | 5/1991 | Chamings et al. | 296/219 |
| 5,052,746 A | | 10/1991 | Reihl et al. | 296/217 |
| 6,164,717 A | | 12/2000 | Haagen | 296/217 |
| 6,273,501 B1 | | 8/2001 | Raasakka et al. | 296/217 |

FOREIGN PATENT DOCUMENTS

| | | | | |
|---|---|---|---|---|
| DE | 3218449 | * | 12/1982 | 296/217 |
| EP | 490213 | * | 5/1992 | 296/217 |
| GB | 2079697 | * | 1/1982 | 296/217 |

* cited by examiner

Primary Examiner—Dennis H. Pedder
(74) Attorney, Agent, or Firm—James R. Eley, Esq.; Michael A. Forhan, Esq.; Thompson Hine LLP

(57) ABSTRACT

A method and apparatus for a manually installable and removable sunroof system comprising a roof with an opening, a roof panel that is removeably secured in the opening, and an upwardly biased and retractable wind deflector assembly stowable within an area near the opening. During installation of the roof panel, the deflector assembly may be held into place by a pivoting and engagingly-biased latch. In one embodiment, as the roof panel is installed, an extension, protruding therefrom, confronts the pivoting latch, at which point the wind deflector is disengaged from the latch and thereafter held in a substantially retracted position by the roof panel. When the roof panel is next removed, the previously retracted wind deflector is automatically deployed into an operational position. In some embodiments, the deflector assembly may be fabricated from a flexible material and may be maintained in a retracted position and subsequently deployed using a manually actuated latch.

21 Claims, 5 Drawing Sheets

LATCHED WIND DEFLECTOR SYSTEM

FIELD

The inventive embodiments are directed towards a stowable wind deflector for use with a manual sunroof that may be easily deployed upon removal of the sunroof.

BACKGROUND

Many vehicles are manufactured or retrofitted in the aftermarket with manual and power sunroofs that may include automatic, removable or permanent wind deflectors to keep unwanted wind and noise from lessening the driving experience. A wind deflector is a device that generally projects upwardly along the front edge of a sunroof opening. As a vehicle moves forward, the wind deflector deflects the air to reduce turbulence thereby lessening the wind noise as it passes directly over the opening. Some wind deflectors are accessory-type devices, which may be affixed to the top of a vehicle that constantly deflect wind regardless of whether the sunroof is open or closed. Deflectors used in connection with powered sunroofs are generally retractable and spring-loaded, which close when the sunroof closes and open when the sunroof opens. The latter are typically used with powered sunroofs because it is relatively easy to incorporate the stowing and deployment of the deflector into the sliding motion of the sunroof panel.

A problem exists, however, with respect to the use of retractable wind deflectors with a manual sunroof. A manual sunroof generally allows a user to detach the sunroof panel from one or more clasps, or other fastening means, and then remove it. This type of sunroof is typically stored in a trunk or other location until it is reinstalled. Most manual sunroofs include one or more hooks or forks located on the front side of the sunroof panel for positioning and securing it within the opening. In such instances, it may be difficult for a user, when reinstalling the sunroof, to position it properly with respect to the retractable deflector, as the user must coordinate the position of the sunroof with respect to the deflector using the panel to retract the deflector into its stowed position, while also trying to properly align the hooks. Oftentimes, the installation of a sunroof must be completed in a hurry because of inclement weather or other adverse conditions, such as darkness. This can create a great deal of frustration on the part of the user, as well as increasing the probability of breaking, tearing or otherwise damaging the deflector.

The breakage and damage issues become even more evident when the materials used for deflectors are considered. Early deflectors were typically made of curved hard plastic structures. However, the current trend in deflector design is to make them from a flexible material of some sort, such as a mesh fabric, stretched over a collapsible frame. The use of the flexible mesh material reduces weight to an extent and provides for compact storage while still giving adequate wind deflection when deployed. However, the positioning hooks which may be located at the front of the sunroof panel, as well as other associated hardware can penetrate the mesh, resulting in unsightliness and a reduction in the wind deflection properties.

Therefore, a stowable wind deflector system that permits a user to easily store a wind deflector in a retracted position during installation of the sunroof is needed in the art. It may also be desirable to spring load the wind deflector or the wind deflector frame, such that it automatically deploys upon release from its retracted position.

SUMMARY

According to one of the inventive embodiments, a manual sunroof system for a vehicle is provided comprising a roof with an opening and a manually installable and removable roof panel sized to fit within and substantially fill the opening. An upwardly biased deflector assembly is coupled to the vehicle and located near the front region of the opening. The deflector assembly is designed having a wind confronting surface and may be retractable below an upper surface of the roof, and is selectively engageable between a retracted and an operational position. The system is provided with a latch, selectively positionable to engage and maintain the deflector assembly in its retracted position while the roof panel is installed and to disengage from the deflector assembly upon removal of the roof panel, the deflector assembly extending into its operational position.

Another of the inventive embodiments provides a manual sunroof system for a vehicle having a roof with an opening and a manually installable and removable roof panel sized to fit within and substantially fill the opening. The roof panel is provided with at least one extension. The system is further provided with an upwardly biased deflector assembly, coupled to the vehicle and located towards the front of the opening and provides a wind confronting surface when in its operational position. The deflector may be retractable for storage below the upper surface of the roof when not deployed. A latch is provided to initially engage and hold the deflector assembly in a retracted position during installation of the roof panel until the latch is disengaged from the deflector assembly upon confrontation with the roof panel extension. Upon disengagement from the latch, the deflector assembly is subsequently held in a substantially retracted position by contact with a bottom portion of the roof panel until the roof panel is removed.

Another inventive embodiment provides a method of providing an automatically deployable wind deflector in a manual sunroof including the steps of providing a roof with an opening, biasing a retractable deflector assembly in an upwardly manner and then coupling the deflector assembly to the vehicle proximate the front region of the opening. The deflector assembly is retractable to a position below the upper surface of the roof and is initially maintained in a retracted position by an engaging latch. A manually removable roof panel, sized to fit within and substantially fill the opening and having at least one roof panel extension for confronting and disengaging the latch from the deflector assembly, is provided. As the roof panel is being installed and the latch is disengaged from the deflector assembly, it is then subsequently held in a substantially retracted position by contact with a bottom portion of the roof panel until the roof panel is removed.

Another inventive embodiment provides for a retractable sunroof deflector system that is initially held in place by a latch during manual installation of a roof panel, subsequently disengaged from the latch upon installation of the roof panel and then automatically deployed upon removal of the roof panel.

Further features of the inventive embodiments will become apparent to those skilled in the art to which the embodiments relate from reading the specification and claims, with reference to the accompanying drawings.

DESCRIPTION OF THE PREFERRED EMBODIMENT(S)

Figure 1:
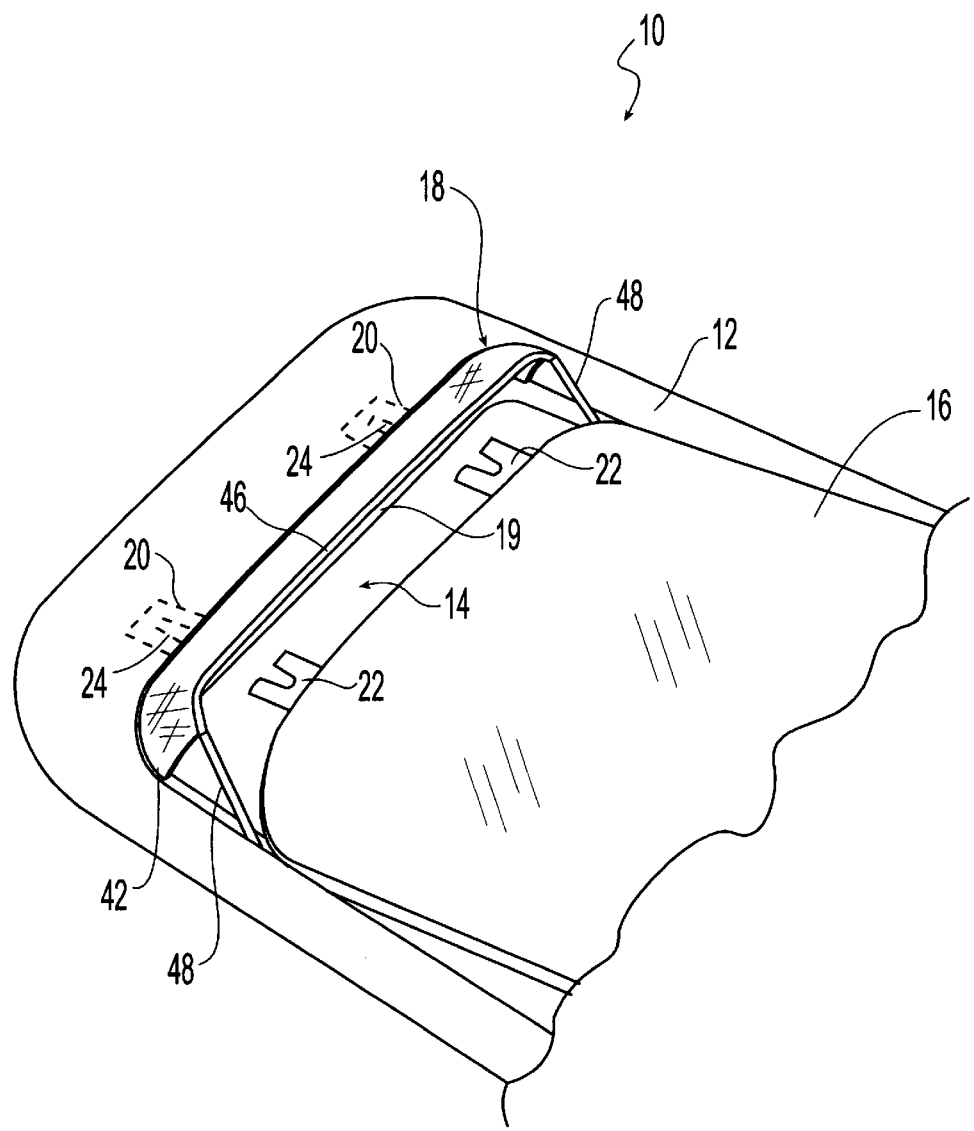
FIG. 1 is a partial perspective view of a manual sunroof and wind deflector system for a vehicle according to one inventive embodiment.

With reference to FIG. 1, a manual sunroof system 10 according to one inventive embodiment is shown. The sunroof system 10 comprises a vehicle roof 12 having an opening 14, into and out of which a suitably sized roof panel 16 is removeably secured. As can be appreciated, roof panel 16 may be constructed of glass, plastic, metal or any other suitable material or combination of materials. The sunroof system 10 further comprises a deflector assembly 18, which may be retracted into a channel 19 located below the opening 14 in roof 12. In this embodiment, where the deflector assembly 18 is preferably upwardly biased to automatically deploy into an operational position as the roof panel 16 is removed. Another embodiment of the invention, discussed below, provides for manual release of the deflector assembly 18 from its retracted position. The sunroof system 10 further comprises a roof panel extension receiving housing 20 (shown in phantom) located inside the roof 12, which receives a roof panel extension 22 extending from an edge of the roof panel 16, preferably the front edge. Although two extensions are depicted at the front area of roof panel 16, it should be appreciated that various numbers of roof panel extensions 22 and configurations of roof panel extension receiving housings 20 may be located at various locations about the roof 12, as needed, to allow a user to removeably secure the roof panel within opening 14 in a multitude of ways.

Figure 2:
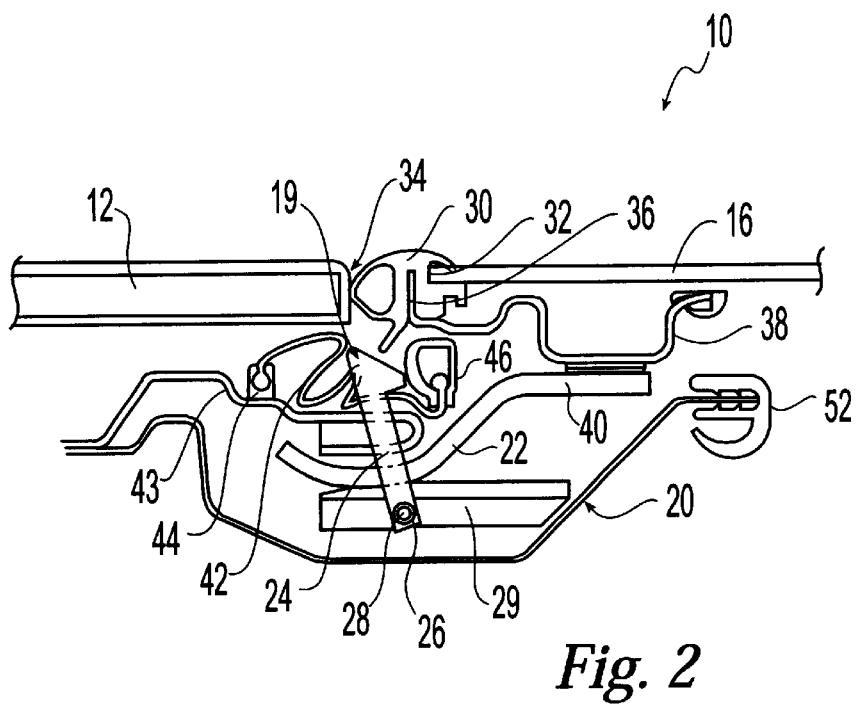
FIG. 2 is a partial elevational view of a cross-section of a manual sunroof and wind deflector system for a vehicle in a retracted position according to one inventive embodiment.
Figure 3:
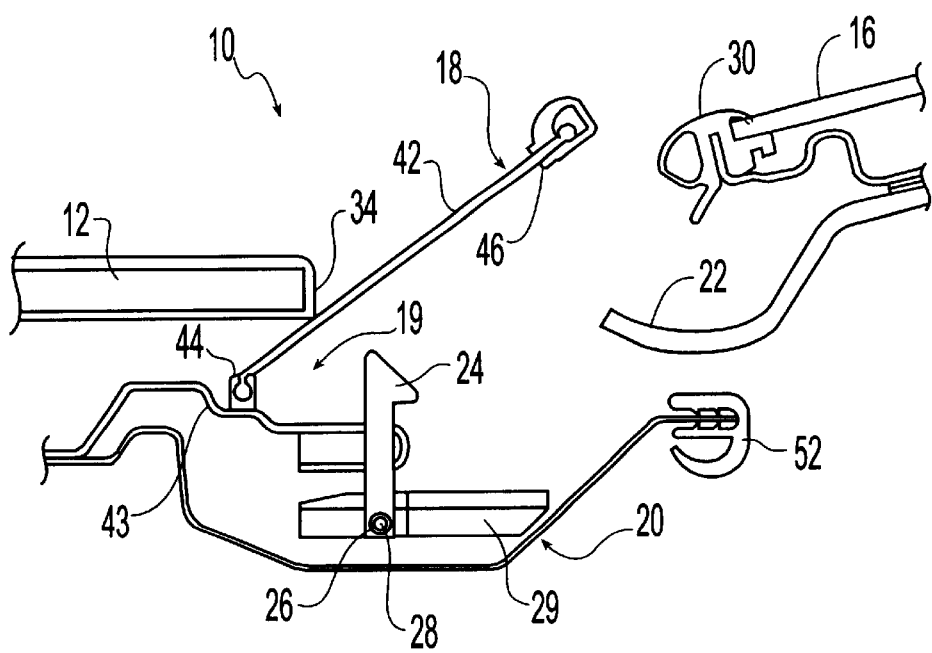
FIG. 3 is a partial elevational view of a cross-section of a manual sunroof and wind deflector system for a vehicle depicting deployment of the wind deflector upon removal of the roof panel according to one inventive embodiment.

Turning now to FIGS. 2 and 3, a section of the sunroof system 10 according to an inventive embodiment is shown in multiple common states, i.e., retracted in FIG. 2 and open in FIG. 3. As seen in these figures, the sunroof system 10 further comprises a latch 24 that may be biased to pivot about pin 28 by a resilient device 26, such as a leaf or coiled spring, or other suitable means. By biasing the latch 24 towards opening 14 (not shown, but to the right as depicted) and into its upper frame member 46 engaging position, as in FIG. 3, it will automatically return to a ready position to engage and retain upper frame member of deflector assembly 18 upon removal of roof panel 16, as more fully described below. The latch 24 is shown to rotate around a pin 28 that passes eccentrically through proximate to one end of latch 24, where the pivoting action is enabled by coupling the latch 24 via the pin to a structural portion 29 of the extension receiving housing 20. An edge of the roof panel 16 may be fitted with a sealing means 30, which seals the gap formed between the outer edge 32 of the roof panel and the confronting edge 34 of the roof 12 surrounding sunroof opening 14. An elongated channel 36 in the sealing means 30 mates with bracket 38 that, in turn, is shown coupled to the distal end 40 of extension 22.

With continuing reference to FIGS. 2 and 3, and again with reference to FIG. 1, the deflector assembly 18 according to several inventive embodiments is shown. The deflector assembly 18 may be comprised of a section of a flexible or foldable material 42 positioned between a lower frame member 44, which may be fabricated as an extrusion, molded, tubular or other structurally suitable form, and an upper frame member 46, which may be of like construction. The lower frame member 44 is preferably coupled to the vehicle inside the opening 14 of the roof 12 to a recessed structural portion, as at 43, of the extension receiving housing 20. However, the lower frame member 44 may be attached anywhere within the channel 19. The upper frame member 46 may be coupled to or formed integrally with pivoting arms 48 as shown in, FIG. 1, one or more of which are upwardly biased, which arms may likewise be coupled to the vehicle proximate the sunroof opening 14. The flexible material 42 may be a mesh, fabricated from natural or synthetic material or other suitable, foldable stock, such as pliable plastic or other resilient material. The flexible material 42 may be folded, wound onto a captive reel or configured in an accordion fashion for storage while in its retracted position. The arms 48 may be biased with a resilient device, such as a coiled or leaf spring or the like (not shown) for automatic deployment of the deflector assembly 18 from its retracted position when the roof panel 16 is removed. However, for so long as the roof panel 16 is in place, the upper frame member 46 is in compressing contact with the bottom of the roof 16, thereby preventing its deployment until the roof panel is removed from the sunroof opening 14. The lower and upper frame members 44 and 46, respectively, and the flexible material 42 may be coupled via suitable hardware and/or adhesive substances to the roof 12, arms 48 and each other, as appropriate.

Figure 4:
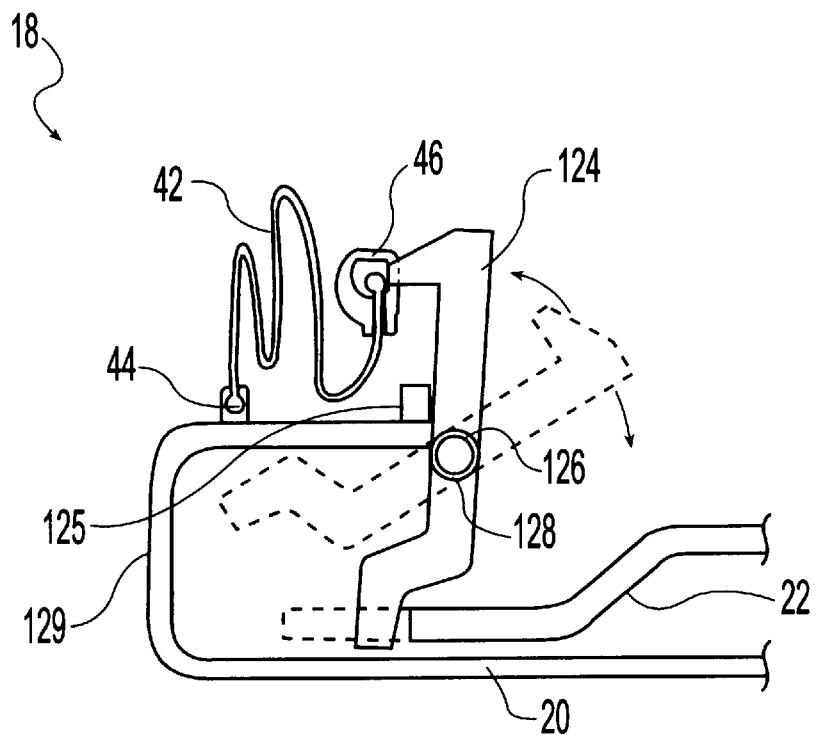
FIG. 4 is a partial elevational view of a pivoting latch in a manual sunroof and wind deflector system for a vehicle according to one inventive embodiment.

Now turning to FIG. 4, a latch 124 according to another inventive embodiment of the system 10 is shown. In this embodiment, the latch 124 is pivotably attached at a center point to structural portion 129 of the roof panel extension receiving housing 20 via a pin 128. Similar to the previously described latch 24, a resilient device 126 biases the latch 124 to captively engage upper frame member 46 until subsequent disengagement by extension 22 as the roof panel 16 is installed. However, in this embodiment the latch 124 is biased away from the opening 14 (not shown, but to the left as depicted) rather than towards it.

In these embodiments, to open the sunroof a user first manually removes the roof panel 16. As the roof panel is removed, deflector assembly 18 is released from its retracted position, no longer being held down by the underside of roof panel 16 and then automatically deploys to its operational position when the biased arm(s) 48 move the upper extrusion 46 from its retracted position, as depicted in FIG. 2, to its deployed, fully operational position, shown in FIG. 3. Once the deflector assembly 18 is in its operational position, the flexible material 42 is stretched between lower 44 and upper 46 frame members, respectively, providing a confronting surface to deflect, or otherwise channel, oncoming air the opening 14 as the vehicle travels forward.

With respect to the previously described embodiments, to replace the roof panel 16, first the user manually presses down on deflector assembly 18 until the latch 24/124 captively engages a portion of the upper frame member 46. Once deflector assembly 18 is engaged, the latch 24/124 retains it in a retracted position as the roof panel 16 is being installed. While the deflector assembly 18 is manually retracted and being held in place by the latch 24/124, the user can easily, and with greatly reduced risk of damaging the flexible material 42, install the roof panel 16 without undue caution. Secondly, the roof panel 16 is placed into the opening 14, and roof panel extension 22 is guided into the roof panel extension receiving housing 20. As roof panel extension 22 enters roof panel extension receiving housing 20, it confronts latch 24/124, as shown by dashed lines in FIGS. 2 and 4, thereby causing the latch 24/124 to pivot in either a clockwise, FIG. 4, or counter-clockwise, FIG. 2, direction, depending upon the configuration of the latch. Through this confronting interaction, latch 24/124 is disengaged from upper frame member 46, thereby releasing upwardly biased deflector assembly 18. Because the roof panel 16 is substantially installed as the roof panel extension 22 confronts the latch 24/124, the release of the deflector assembly 18, in these embodiments, requires no additional action on the user's part. Once disengaged from latch 24/124, upwardly biased deflector assembly 18 is compressed by roof panel 16 in a substantially retracted position until the roof panel 16 is once again removed from roof opening 14. For as long as roof panel 16 is in place, upper frame member 46 will be compressed by the bottom of the roof panel preventing deployment of deflector assembly 18 until removal of the roof panel. Upon removal of roof panel 16, the upwardly biased deflector assembly 18 again automatically deploys, as described above, and the latch 24/124 returns to a ready position, such that it is in position to catch upper frame member 46 upon a subsequent retraction of the deflector assembly.

Figure 5:
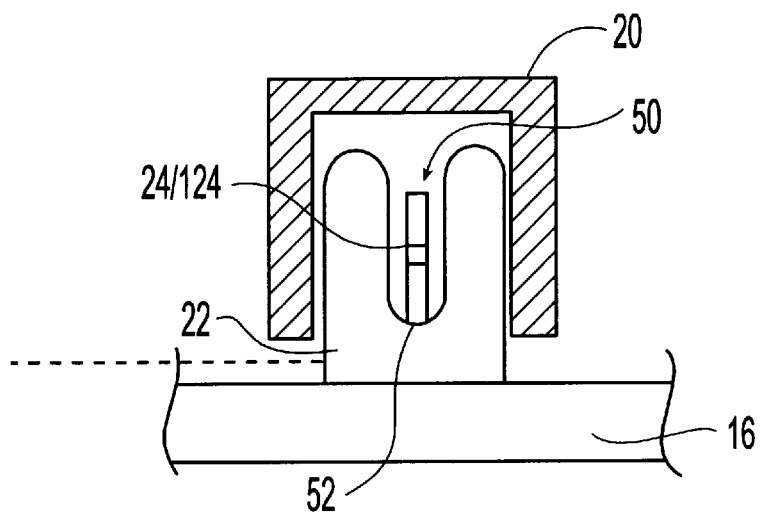
FIG. 5 is a simplified partial plan view of a sectioned portion of a roof panel extension confronting a pivoting latch during installation of a manual sunroof according to one inventive embodiment.

Referring now to FIG. 5, another embodiment the roof panel extension 22 may have a elongated longitudinal opening 50, such as a slot, though which the body of latch 24/124 passes until the latch contacts a contact area 52 of the roof panel extension. This opening 50 may further act as a guide to accurately direct the roof panel extension 22 into the roof panel extension receiving housing 20. As the latch 24/124 is confronted by the contact area 52 of the roof panel extension 22, the latch rotates clockwise, as in FIG. 2, or counter-clockwise, as in FIG. 4, direction. A latch stop 125 may be provided within the roof panel extension receiving housing 20 to limit a range of motion of the latch in its biased direction.

It can be appreciated that in this embodiment the latch 24/124 may be positioned at any location proximate the opening 14 of the roof 12, so long as it is disengaged by some portion of deflector assembly 18 during installation of the roof panel 16. Further, in other embodiments, more than one set of latches 24/124, roof panel extension receiving housings 20, and roof panel extensions 22 may be employed. It is also anticipated that these interactive components of the inventive embodiments may be located at other positions within the area of the opening 14 and are not limited to being located proximate the front of the opening.

Figure 6:
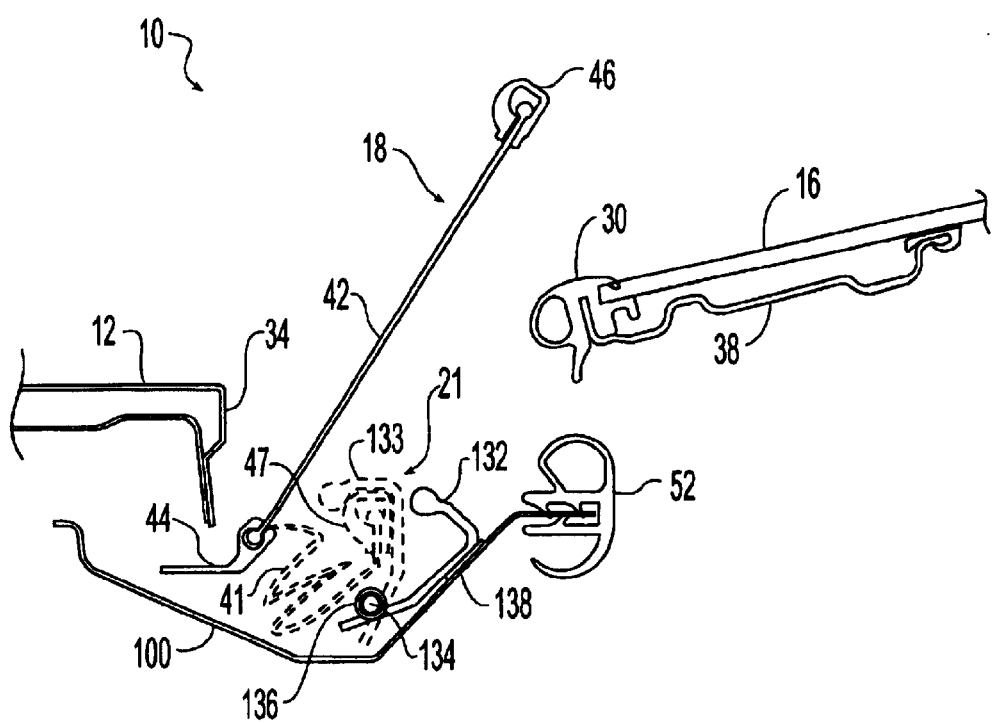
FIG. 6 is a partial elevational view of a cross-section of a manual sunroof and wind deflector system for a vehicle depicting deployment of the wind deflector following manipulation of a latching device according to one inventive embodiment.

Referring now to FIG. 6, another embodiment of a sunroof system 10 is shown with deflector assembly 18 depicted in its deployed, operational position. In this case the retention of deflector assembly 18 in its retracted position is effected manually. As shown, this embodiment provides a latch 132 that may be biased to pivot about pin 134 using a resilient device 136, such as a leaf or coiled spring, or other suitable means. Latch 132 is preferably biased to rotate away from deflector assembly 18 when not in use. A cushion 138 may be employed, attached to an area of deflector assembly receiving housing 100 behind the latch 132, to provide a soft resting place for the latch when it is not in use.

As in previous embodiments, deflector assembly 18 comprises a lower frame member 44 that is fixed in a suitable manner to the vehicle in an area proximate the deflector assembly receiving housing 100. Lower frame member 44 is used to captively retain the proximal edge of flexible material 42. The distal edge of flexible material 42 is engaged by upwardly biased upper frame member 46 such that when released from latch 132, the upper frame member extends upwardly and stretches the flexible material 42 into its substantially flat, operating condition.

In operation, deployment of deflector assembly 18 may be accomplished in the following, or similar manner. First, roof panel 16 is removed from opening 14 exposing a deflector assembly 21 in its retracted position. This is represented in FIG. 6 showing flexible material 41 shown in folded condition (shown in phantom), connected on one end to fixed lower frame member 44 and to retracted upper frame member 47 (shown in phantom) on the other. Deflector assembly 21 is retained by latch 132 being moved to its engaging position, as shown in FIG. 6 as latch 133 (shown in phantom).

Following removal of roof panel 16, retracted deflector assembly 21 may be deployed by manually disengaging latch 133 from upper frame assembly 47. Upon disengagement, latch 133 pivots to its resting position, as shown at 132 and upwardly biased upper frame member 47 is permitted to pivot to its operation position, as shown at 46. Once deflector assembly 18 has been deployed, flexible material 42, now stretched between upper and lower frame members 44 and 46, forms a deflecting surface to confront oncoming wind.

To reinstall roof panel 16, deflector assembly 18 is first retracted by pressing down and forward on upper frame member 46 until it is positioned essentially as shown in phantom at 47. Flexible material 42 may then be folded or otherwise arranged for storage, preferably in a manner to avoid interfering with other sunroof system components. In this embodiment, the flexible material 42 is shown to occupy the available space between lower frame member 44 and retracted upper frame member 47. Once retracted, frame member 47 may be retained in its depressed position by manually deploying a captive device, such as pivoting latch 132, to engage frame member 47, as shown in phantom at 133. Following the retraction of deflector assembly, as shown in phantom at 21, roof panel 16 may be placed within opening 14 and secured in conventional fashion. In the alternative, the user may choose to operate the vehicle with the deflector assembly 18 retracted, but without reinstallation of the roof panel 16.

Figure 7:
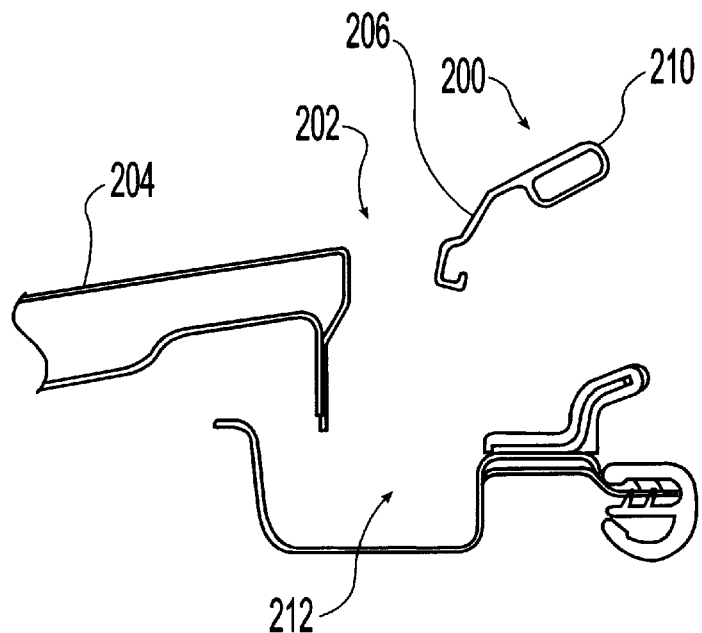
FIG. 7 is a view of a wind deflector having a non-flexible wind confronting surface according to one inventive embodiment, shown in a deployed position.
Figure 8:
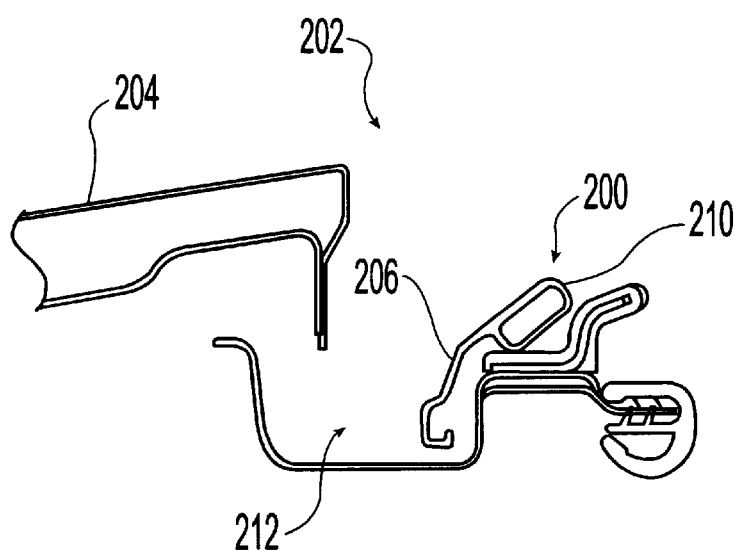
FIG. 8 is a view of a wind deflector having a non-flexible wind confronting surface according to one inventive embodiment, shown in a retracted position.

A modification to the disclosed structure is shown in FIGS. 7 and 8. FIG. 7 shows an upwardly-biased deflector assembly 200 coupled to a vehicle and located proximate an opening 202 in a vehicle roof 204. The deflector assembly 200 has a wind confronting surface 206. The deflector assembly 200 is retractable below an upper surface 208 of the roof 204, as shown in FIG. 8. The deflector assembly 200 is selectively engageable between a retracted position, as shown in FIG. 8, and the operational position, as shown in FIG. 7. A latch (not shown in this Figure) of the same design as shown in the other Figures may be used in connection with this deflector assembly 200.

The primary difference between the deflector assembly 200 shown in FIGS. 7 and 8 and those shown in previous Figures is in the material used for the wind confronting surface 206. In the earlier Figures, it was disclosed that the use of a flexible material is preferred for the wind confronting surface. However, in FIGS. 7 and 8, it is shown that a non-flexible material may be used for the wind confronting surface 206. In such a case, the non-flexible material would be secured only to an upper frame member 210. A biasing means substantially identical to that shown in previous Figures but not shown in this Figure acts upon the upper frame member 210 to extend the upper frame member 210 above the roof opening 202 when the deflector assembly 202 is released from the latch. As is disclosed in connection with earlier embodiments, the upper frame member 210 is pivotably coupled to the vehicle proximate the opening 202. It is noted that since the material is non-flexible, it need not be stretched between two frame members as in the earlier Figures. Instead, the lower frame member may be eliminated in this embodiment. As is disclosed in the other embodiments, the wind confronting surface 206 formed of a non-flexible material is effective as a wind deflector when the upper frame portion 210 is extended above the roof opening, as is shown in FIG. 7.

The present embodiment has the same attachment structures and interacts with the latch structure in the same way as other embodiments previously disclosed. The use of a non-flexible material is less preferred in some instances, as the channel 212 into which the deflector assembly 202 fits when the sunroof is installed must be made larger than if a flexible material is used. However, since most deflector assemblies in the industry are not made of flexible material, the increased cost and weight due to the increased size of the channel 212 may be outweighed by the increased cost of designing, testing, and using a non-standard wind deflector, rather than a deflector assembly that uses a non-flexible material, which would already likely have been tested, designed, and used.

The features of the invention have been described in detail with respect to specific embodiments thereof, but it will be apparent that numerous variations and modifications are possible without departing from the spirit and scope of the inventive embodiments as defined by the following claims.

What is claimed is:

1. A manual sunroof system for a vehicle comprising:
    a roof with an opening;
    a manually installable and removable roof panel sized to fit within and substantially fill the opening;
    at least one extension extending from the roof panel;
    an upwardly biased deflector assembly coupled to the vehicle and located proximate the opening, said deflector assembly having an upper frame member and a wind confronting surface, and being retractable below an upper surface of the roof; and
    a pivoting latch, biased to initially engage the upper frame member and maintain the deflector assembly in a retracted position during installation of the roof panel until being disengaged upon confrontation with the extension, the deflector assembly being subsequently held in a substantially retracted position by contact with a bottom portion of the roof panel until the roof panel is removed.

2. The sunroof system of claim 1 wherein the upper frame member is pivotably coupled to the vehicle proximate the opening and the deflector assembly further comprises:
    a lower frame member coupled to the vehicle proximate the opening;
    a biasing means acting upon the upper frame member effective to extend the upper frame portion above the roof opening when the deflector assembly is released from said pivoting latch; and
    a flexible material, stretched between the upper and lower frame members to provide a wind confronting surface when the upper frame portion is extended above the roof opening.

3. The sunroof system of claim 1 wherein the upper frame member is pivotably coupled to the vehicle proximate the opening and the deflector assembly further comprises:
    a biasing means acting upon the upper frame member effective to extend the upper frame member above the roof opening when the deflector assembly is released from the latch; and
    a wind confronting surface formed of a non-flexible material and effective as a deflector when the upper frame portion is extended above the roof opening.

4. The sunroof system of claim 1 further comprising a channel inside the roof opening into which the deflector is retracted.

5. The sunroof system of claim 1 wherein the pivoting latch pivots about its center.

6. The sunroof system of claim 1 wherein the pivoting latch pivots about an eccentrically located pivot point.

7. The sunroof system of claim 1 wherein the latch pivots towards the roof opening.

8. The sunroof system of claim 1 wherein the latch pivots away from the roof opening.

9. The sunroof system of claim 1 further comprising at least one roof panel extension receiving housing, through which the pivoting latch extends and into which at least one roof panel extension is directed during installation of the roof panel.

10. The sunroof system of claim 1 wherein the roof panel extension is slotted, through which a portion of the pivoting latch passes prior to engaging a confronting portion of the roof panel extension.

11. The sunroof system of claim 2 wherein the flexible material is a mesh material.

12. The sunroof system of claim 2 wherein the flexible material is a non-mesh material.

13. A method of deploying a wind deflector in a manual sunroof, comprising the steps of:
    providing a roof with an opening;
    biasing a retractable deflector assembly having an upper frame member in an upwardly manner;
    coupling the deflector assembly to the vehicle proximate the opening, the deflector assembly being retractable into a position below the upper surface of the roof and being initially maintained in a retracted position by a latch, the latch engaging the upper frame member;
    providing a manually removable roof panel sized to fit within and substantially fill the opening;
    providing at least one roof panel extension for confronting and disengaging the latch from the deflector assembly as the roof panel is being installed, wherein the retracted deflector assembly is subsequently held in a substantially retracted position by contact with a bottom portion of the roof panel until the roof panel is removed.

14. The method of claim 13 wherein the deflector assembly is automatically deployed when the roof panel is removed.

15. The method of claim 13 further comprising the step of retracting the deflector assembly into a channel in the roof below the opening prior to placement of the roof panel into the roof opening.

16. The method of claim 13, wherein the coupling of the deflector assembly to the vehicle further comprises the steps of:

providing a deflector assembly having upper and lower frame members;

coupling the lower frame member to the vehicle proximate the opening;

pivotably coupling the upper frame member to the vehicle proximate the opening;

biasing the upper frame members effective to pivotally extend the upper frame member upwardly when not being retained in a retracted position by an engaging latch; and stretching a flexible material between the upper and lower frame members, wherein, as the roof panel is removed, the upper frame member extends from the front of the opening to a position above the upper surface of the roof and the flexible material stretches between the upper and lower frame members to provide a wind confronting surface.

17. The method of claim 16 wherein the flexible material is provided as a mesh material.

18. The method of claim 16 wherein the flexible material is provided as a non-mesh material.

19. The method of claim 13, wherein the coupling of the deflector assembly to the vehicle further comprises the steps of:

providing a deflector assembly having an upper frame member;

pivotably coupling the upper frame member to the vehicle proximate the opening; and biasing the upper frame member effective to pivotably extend the upper frame member upwardly when not being retained in a retracted position by an engaging latch, wherein, as the roof panel is removed, the upper frame member extends to a position above the upper surface of the roof effective to provide a wind confronting surface.

20. A manual sunroof system for a vehicle comprising:

a roof with an opening;

a manually installable and removable roof panel sized to fit within and substantially fill the opening;

an upwardly biased deflector assembly coupled to the vehicle and located proximate to the opening, said deflector assembly having an upper frame member and a wind confronting surface, and being retractable below an upper surface of the roof, wherein said assembly is selectively engageable between a retracted and an operational position; and a latch for selectively engaging the upper frame member effective to retain said assembly in its retracted position when not in its operational position, the latch being pivotable and biased towards the roof opening.

21. A manual sunroof system for a vehicle comprising:

a roof with an opening;

a manually installable and removable roof panel sized to fit within and substantially fill the opening;

an upwardly biased deflector assembly coupled to the vehicle and located proximate to the opening, said deflector assembly having an upper frame member and a wind confronting surface, and being retractable below an upper surface of the roof, wherein said assembly is selectively engageable between a retracted and an operational position; and a latch for selectively engaging the upper frame member effective to retain said assembly in its retracted position when not in its operational position, the latch being pivotable and biased away from the roof opening.

* * * * *